(12) United States Patent
Dehnert

(10) Patent No.: US 6,754,036 B2
(45) Date of Patent: Jun. 22, 2004

(54) AUTOMATED TUNING OF DISC DRIVE SEEK PROFILE

(75) Inventor: Kenneth Steven Dehnert, Burnsville, MN (US)

(73) Assignee: Seagate Technology LLC, Scotts Valley, CA (US)

(*) Notice: Subject to any disclaimer, the term of this patent is extended or adjusted under 35 U.S.C. 154(b) by 308 days.

(21) Appl. No.: 10/060,881

(22) Filed: Jan. 29, 2002

(65) Prior Publication Data
US 2002/0131195 A1 Sep. 19, 2002

Related U.S. Application Data

(60) Provisional application No. 60/264,892, filed on Jan. 29, 2001.

(51) Int. Cl.⁷ .............................................. G11B 5/596
(52) U.S. Cl. .................................................. 360/78.07
(58) Field of Search ........................... 360/78.07, 78.06

(56) References Cited

U.S. PATENT DOCUMENTS

| | | | |
|---|---|---|---|
| 5,151,639 A | * 9/1992 | Hasegawa et al. | 318/568.18 |
| 5,383,068 A | * 1/1995 | Shimizu et al. | 360/78.06 |
| 5,570,332 A | 10/1996 | Heath et al. | 369/50 |
| 6,170,042 B1 | 1/2001 | Gaertner et al. | 711/158 |
| 6,272,565 B1 | 8/2001 | Lamberts | 710/43 |

* cited by examiner

*Primary Examiner*—David Hudspeth
*Assistant Examiner*—Mitchell Slavitt
(74) *Attorney, Agent, or Firm*—David K. Lucente; Derek J. Berger

(57) ABSTRACT

Methods and systems in a data storage device selectively employ a seek time array and/or a seek time list to accurately predict a time required for a seek operation to move a transducer in the data storage device a given seek distance. The seek time list and/or seek time profiles are automatically compiled in the data storage device based on seek time entries located in a servo data table located in the data storage device.

30 Claims, 9 Drawing Sheets

AUTOMATED TUNING OF DISC DRIVE SEEK PROFILE

RELATED APPLICATIONS

This application claims priority of U.S. provisional application Ser. No. 60/264,892, filed Jan. 29, 2001.

FIELD OF THE INVENTION

This application relates generally to determining a seek profile in a data storage device and more particularly to a system and/or method for automatically determining disc drive seek profiles for use in command queue ordering.

BACKGROUND OF THE INVENTION

Modern hard disc drives comprise one or more rigid discs that are coated with a magnetizable medium and mounted on a hub of a spindle motor for rotation at a constant high speed about a rotational axis. Information is stored on one or more surfaces of the disc or discs in a plurality of concentric circular tracks. An aggregate of tracks on the surfaces of a disc or discs at a given radial position from the rotational axis is referred to as a cylinder. Data is written to, and/or read from, sectors on the tracks via transducers ("heads") mounted to a radial actuator, which positions the heads relative to the discs. The read/write elements are typically positioned over specific sectors of the disc in accordance with commands received from a host computer.

Typical disc drives use microprocessors to execute commands received from the host computer. Often, the disc drive will receive commands from the host faster than the commands can be processed by the microprocessor. When this occurs, the commands which are waiting to be executed are typically queued or cached in a "command queue" for later processing. As the commands coming into the disc drive are not necessarily received in an optimal order for processing, optimization of the queued commands is desirable. For example, a disc drive may receive commands to read and write data at a variety of locations on the hard discs within the disc drive. Optimally, these commands would be processed in a manner which would minimize the movement of the disc drives read/write heads across the disc. Ordering the commands in this manner is called command queue reordering. Command queue reordering allows for a more efficient use of the microprocessor as well as a more efficient use of the hardware being controlled by the microprocessor.

Traditionally, disc drives have sorted commands in an order that minimizes latency between the various commands. To determine if a seek can be completed within a given amount of latency, the seek time must be calculated. The seek time is the time required for the read/write element to radially move across or traverse cylinders between the present cylinder over which the read/write element is positioned and the cylinder to be addressed by the particular command. To determine the seek time for a particular command, disc drives often use what is referred to as a seek profile to define seek times versus seek distance in the disc drive. Often this seek profile is implemented as a seek time array containing entries for various seek times versus seek distance on the disc drive. This seek time array may be used on its own or, alternatively, a seek time array may be used as a single element or input into a more complex command queue reordering process that takes into account the rotational latency of the disc drive in determining the optimal order of commands in the command queue. An example of one such process is rotational position sorting (RPS). One rotational position sorting process is described in U.S. Pat. No. 5,570,332 for "Method for Reducing Rotational Latency in a Disc Drive" to Heath, et al., which is incorporated herein by this reference.

In its most precise form, a seek profile would indicate the precise seek time for each seek distance that may be traversed in a disc drive. For example, this type of seek profile could comprise a seek time array containing an individual entry for each possible seek distance on a disc. Unfortunately, as modern disc drives contain tens of thousands of tracks on a single disc, the memory requirements for storing and maintaining a comprehensive seek time array of this type is prohibitive. One approach that has been used to reduce the memory requirements of seek profiles involves using a partial seek time array to compute seek times for relatively short seeks and a simple linear equation to compute seek times for relatively longer seek distances. This approach takes advantage of a particular characteristic of the overall seek profile of many, particularly older, disc drives. That is, the relationship between seek times and seek distances in the portion of the seek profile corresponding to relatively longer seek times is substantially linear. As such, the seek profile in this so called "linear region" can be characterized using a linear equation that, in turn, is used to predict a seek time for a given seek distance. In contrast, the relationship between seek times and seek distances in the portion of the seek profile corresponding to relatively shorter seek times is substantially non-linear. As such, a partial seek time array is used to compute seek times in this "non-linear" region of the seek profile, where a simple linear equation would not accurately model the seek profile.

The seek time array, as described so far, may be either static or dynamic. A static seek time array is a precomputed look-up table constructed from a static seek profile. The static seek profile consists of piecewise-linear approximations of actual seek performance. These approximations are typically determined manually by a test engineer after viewing a graph or some other representation of actual seek times versus seek distances as measured in a representative disc drive of a particular model type. The piecewise-linear approximation typically comprises a number of straight line segments, each assigned to a non-overlapping range of seek lengths, which together estimate performance for seeks within the non-linear range. This piecewise-linear approximation is then used to construct the look-up table of the static seek time array, which is stored in memory on the disc drive for use during operation.

While the use of a static seek time array in the manner just described has proven relatively effective, there are still a number of problems associated therewith. One such problem relates to the manner in which straight line segments for the piecewise-linear approximations defining the static seek time array are determined. As mentioned, these segments are typically defined manually as approximations of the actual seek performance by a test engineer after viewing seek data taken from a representative disc drive. As such, the accuracy of these approximations is limited by the skill, or the lack thereof, of the test engineer who makes these approximations. Another problem associated with the way static seek arrays of this type array are determined is that the seek characteristics of a given model of disc drive may vary significantly from drive to drive. As such, a static seek time array that is computed based on the results of one representative drive of a particular model, may not be accurate for other drives of the same model. Additionally, seek characteristics of a single disc drive may change measurably over time, thus degrading the accuracy of the static seek array.

An alternative to the static seek time array, and one that addresses some of the noted problems of the static seek array, is a dynamic or adaptive seek time array. Similar to the static seek array, the adaptive seek array is an array or look-up table containing estimated seek times required for read/write element to traverse a given seek distance or length, in cylinders. The adaptive seek array typically uses the static seek array to initialize its look-up table. However, each time read/write element traverses a given number of cylinders to execute a command, the system or firmware of the disc drive senses the actual seek time necessary for the read/write element to traverse the given seek distance. Based on the sensed actual seek times for seek distances, the estimated seek times corresponding to seek distances within the adaptive seek array are modified.

While an adaptive seek array addresses some of the problems of the static seek array, adaptive seek arrays still retain some of the problems noted above with respect to static seek arrays. For example, as described, the values of the static seek array are typically used to initialize the look-up table of the static seek array. As such, the initial values of the static seek array are based on values taken from a representative drive rather than from the disc drive in which the static seek array is deployed. While these values will be modified over the course of operation of the disc drive to more closely match the characteristics of that particular disc drive, the disc drive employing the adaptive seek array may need to be operated for some time before the values of the adaptive seek array approach or match the true seek characteristics of the disc drive. In the case where the disc drive must reinitialize the adaptive seek profile every time the drive is restarted, the adaptive seek array may never approach or match the true seek characteristics of the disc drive. Additionally, in the case where performance bench testing is performed on the disc drive, the disc drive is typically not operated in a manner or time that is sufficient for the adaptive seek array to adjust to match the true seek characteristics of the disc drive.

Another problem associated with the above described methods relates to the use of a single linear equation to characterize the seek profile in the "linear region." As is known, many modern disc drives employ a servo loop control algorithm that uses different sets of control parameters for different ranges of seek distances to control the movement of the read/write transducers of the disc drive during track seek operations. For example, one set of control parameters may be used to carry out seek operations having seek lengths in the range of one-thousand and two-thousand cylinders, while another set of control parameters may be used to carry out seek operations having seek lengths within the range of two-thousand and three-thousand cylinders, and so on. One affect of using different sets of control parameters for different seek ranges is that the so called "linear region" of the disc drives seek profile is no longer linear. In fact, this "linear region" may have a number of significant non-linearities or discontinuities. As such, a single linear equation will not accurately model the "linear region" of the seek profile of a disc drive using a servo loop control algorithm that employs multiple sets of control parameters.

It is against this backdrop that the present invention has been developed.

SUMMARY OF THE INVENTION

Various embodiments of the present invention relate to methods and systems for accurately predicting seek times for given seek distances in a data storage device. Additionally, various embodiments relate to the automatic compilation and storage of seek time arrays and/or seek time lists in a disc drive device. More particular, various methods described herein relate to automatically compiling a seek time list in a disc drive based on seek time entries located in a servo data table located in the disc drive.

One method described herein relates a method for determining an estimated seek time for a transducer to travel a given seek distance in a data storage device, In this method, a seek time array is used in conjunction with a seek time list to determine estimated seek times in a disc drive. In one embodiment, the seek time array defines one to one relationships between seek times and seek distances in a first range of seek distances. For example, the seek time array may contain a plurality of ordered pairs, each ordered pair including a seek time and an associated seek distance. To determine a seek time for a given seek distance occurring in the first range of seek distance, the seek array is searched for an ordered pair including the given seek distance and the associated seek time is then used to predict the seek time for the transducer to travel the given seek distance.

In contrast to the seek time array, the seek time list defines a series of linear relationships between seek times and seek distances in a second range of seek distances. The seek time list may include sets of ordered pairs, wherein each set of ordered pairs defines a relationship between a seek times and seek distances with a sub-range of the second range of seek distances. Then, to determine a seek time for the given seek distance occurring in the second range of seek distance, the appropriate set of ordered pairs is located, and that set of ordered pairs is used to predict the seek time required for the transducer to travel the given seek distance.

Also described herein are methods and systems relating compiling the seek time array and the seek time list. These and various other features as well as advantages which characterize the present invention will be apparent from a reading of the following detailed description and a review of the associated drawings.

DETAILED DESCRIPTION

Figure 1:
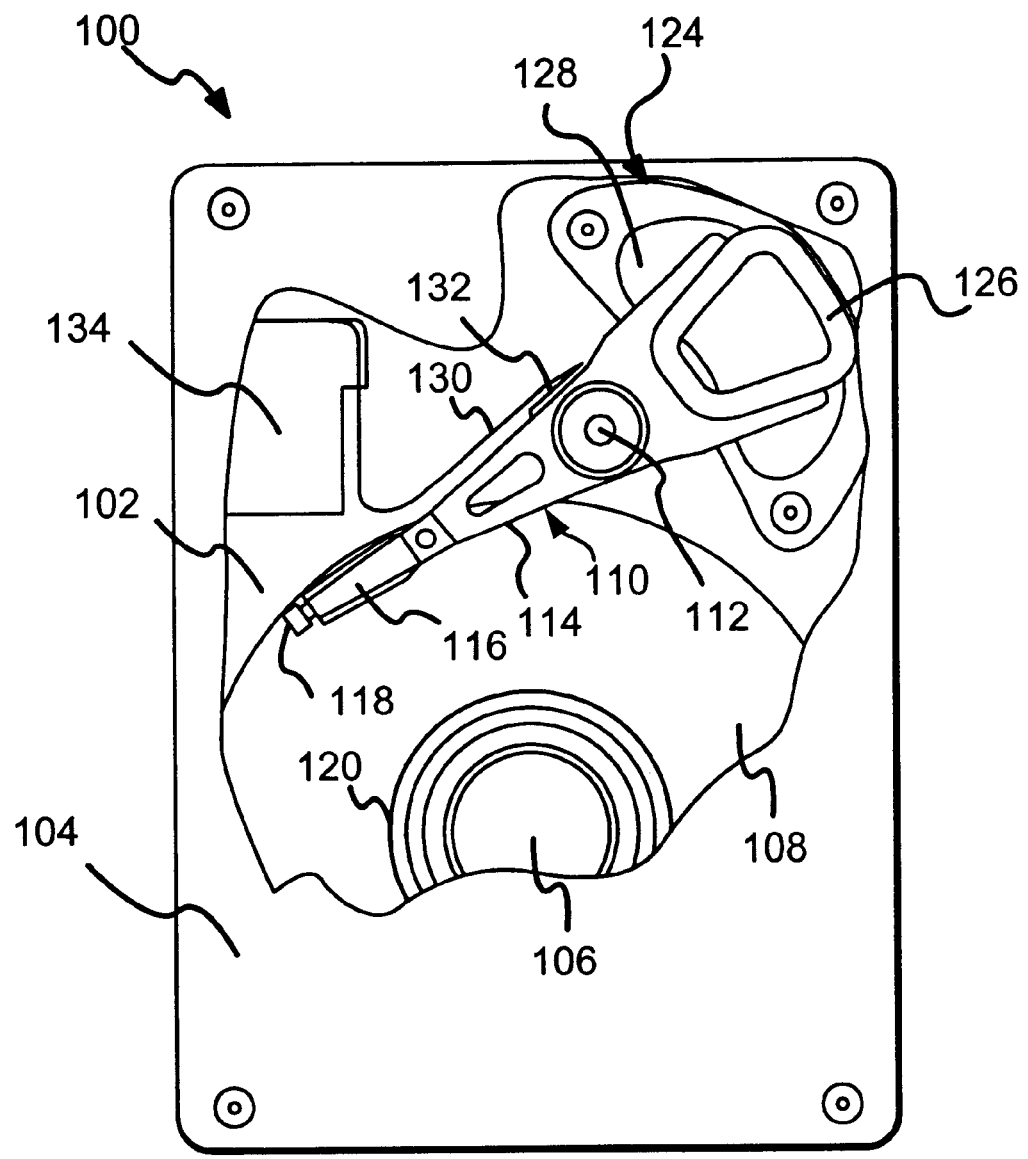
FIG. 1 illustrates a plan view of a disc drive incorporating a preferred embodiment of the present invention showing the primary internal components.

A disc drive 100 constructed in accordance with a preferred embodiment of the present invention is shown in FIG.

1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks 120 on the discs 108 through the use of an actuator assembly 110, which rotates during a seek operation about a bearing shaft assembly 112 positioned adjacent the discs 108. An aggregate of tracks on the surfaces of a disc or discs at a given radial position from the rotational axis is referred to as a cylinder. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
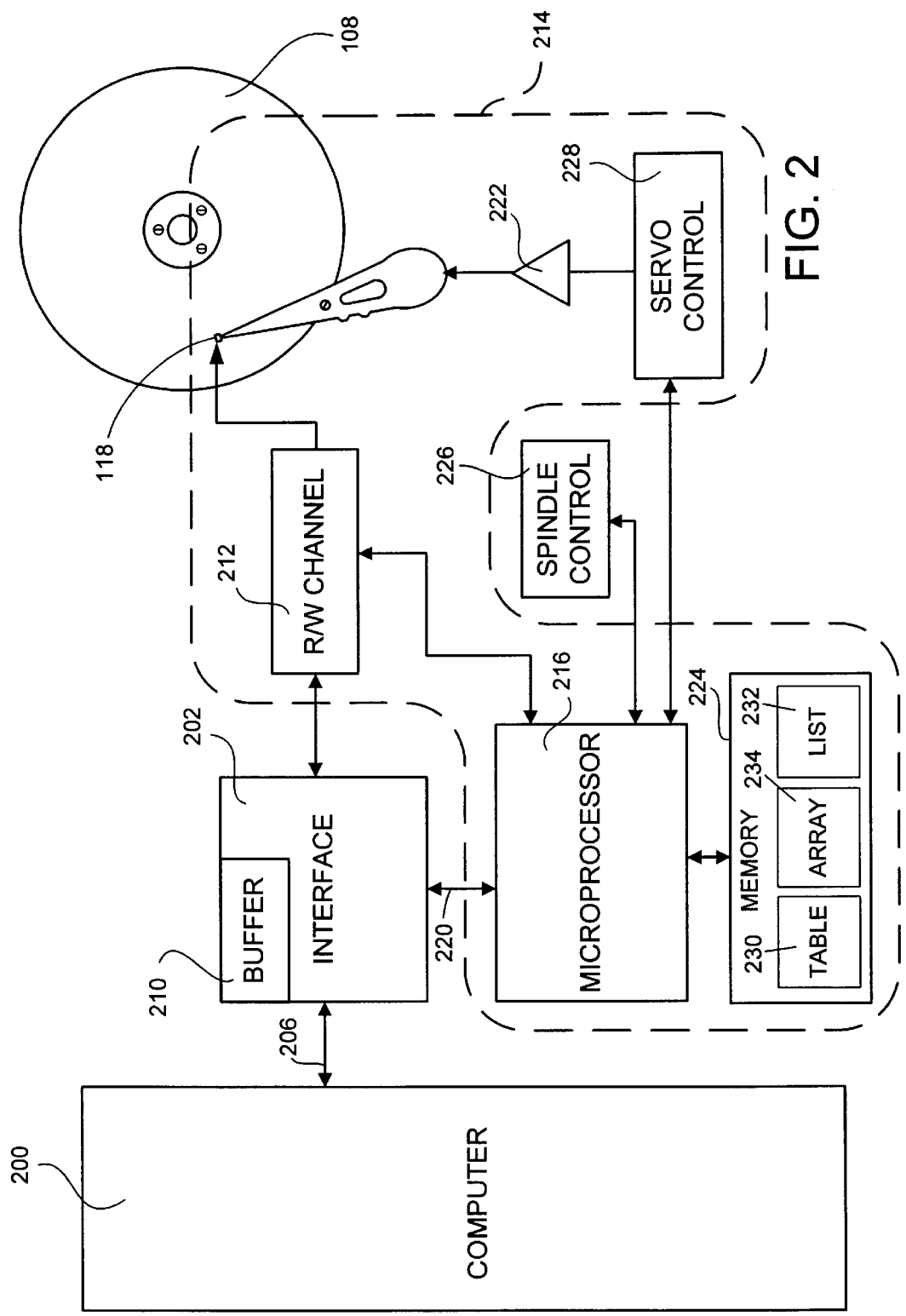
FIG. 2 illustrates a simplified functional block diagram of the disc drive shown in FIG. 1.

Referring now to FIG. 2, shown therein is a functional block diagram of the disc drive 100 of FIG. 1, generally showing the main functional circuits which are typically resident on a disc drive printed circuit board and which are used to control the operation of the disc drive 100. As shown in FIG. 2, the host computer 200 is operably connected 206 to an interface application specific integrated circuit (interface) 202. The interface 202 typically includes an associated buffer 210 which facilitates high speed data transfer between the host computer 200 and the disc drive 100. Data to be written to the disc drive 100 are passed from the host computer to the interface 202 and then to a read/write channel 212, which encodes and serializes the data and provides the requisite write current signals to the heads 118. To retrieve data that has been previously stored by the disc drive 100, read signals are generated by the heads 118 and provided to the read/write channel 212, which performs decoding and error detection and correction operations and outputs the retrieved data to the interface 202 for subsequent transfer to the host computer 100. Such operations of the disc drive 200 are well known in the art and are discussed, for example, in U.S. Pat. No. 5,276,662 to Shaver et al.

As also shown in FIG. 2, a microprocessor 216 is operably connected 220 to the interface 202. The microprocessor 216 provides top level communication and control for the disc drive 200 in conjunction with programming for the microprocessor 216 which is typically stored in a non-volatile microprocessor memory (MEM) 224. The MEM 224 can include random access memory (RAM), read only memory (ROM) and other sources of resident memory for the microprocessor 216. Additionally, the microprocessor 216 provides control signals for spindle control 226, and servo control 228. The microprocessor 210, together with the servo control 228, the actuator assembly 110, and the read/write channel 218 form what is commonly referred to as the servo control loop 214.

In operation, the microprocessor 210 receives a seek command from the host computer 200 that indicates that a particular track 120 on the discs 108 is to be accessed. In one embodiment, in response to a particular seek command, the microprocessor 210 selects a set of control parameters, to compute an appropriate current profile to move the head 118 from its current position to the track that is to be accessed. In another embodiment, the servo controller selects the set of control parameters and computes the appropriate current profile.

In determining the appropriate set of control parameters to be used in computing an appropriate current profile for a given seek operation, a servo data table 230 is consulted. The servo data table 230 includes a list of seek distances at which the microprocessor or servo controller start using different parameters. As such, each of a number of ranges of seek distances is defined by two seek distances present in the servo data table 230. A particular set of control parameters is associated with each of the ranges of seek distances. By consulting the servo data table 230 an associated set of control parameters is selected for a given seek command. A current profile is then computed using the associated set of control parameters.

Once an appropriate current profile has been computed, it is sent to an amplifier 222 for amplification. The amplifier 222 then provides a driving current corresponding to current profile to the coil 126. In response to the driving current, the actuator assembly 110 accelerates toward the target track and then decelerates and stops the actuator assembly 110 when the head 118 is over the target track and the seek operation is completed.

As shown in FIG. 2, in one embodiment, the servo data table 230 is stored in MEM 224. However, it is to be understood that location of the servo data table 230 is not limited to the MEM 230. The servo data table 230 may be stored in other non-volatile memory in the disc drive, such as on a disc 108 of the disc drive 100. Additionally, the servo data table 230 may be stored for use in volatile memory. For example, the servo data table 230 may initially be stored on a disc 108 and then, when the disc drive is in operation, the servo data table 230 may be copied from the disc 108 into some form of volatile memory which is accessible by the microprocessor and/or the servo controller, such as random access memory (RAM).

Also included in the disc drive 100 are one or more representations of a seek profile. The seek profile is used to define or estimate a seek time required for each seek distance that may be traversed in the disc drive 100. In other words, the seek profile defines, or estimates, the amount of time that it will take the read/write transducer to move from one track to another during a seek command. The seek profile preferably estimates the seek time for every possible seek distance in the disc drive. Once compiled, the seek profile may be used by a number of process of the disc drive. For example, the seek profile may be used for estimating seek times for various queued commands in a command queue reordering process. The seek profile may be used to determine whether sufficient time exists to perform data pre-fetching or data post-fetching. The seek profile may also be used to determine whether a faster seek or a slower seek is sufficient to carry out a particular seek command. While a number of uses for the seek profile have been described, it is to be understood that the seek profile as described herein is not limited solely to the use in these processes and that the seek profile may be used in conjunction with, or as a part of any, a number of other disc drive processes. As will be described in greater detail below, in one embodiment, the servo data table 230 is used in a process for establishing a seek profile for the disc drive 100.

Figure 3:
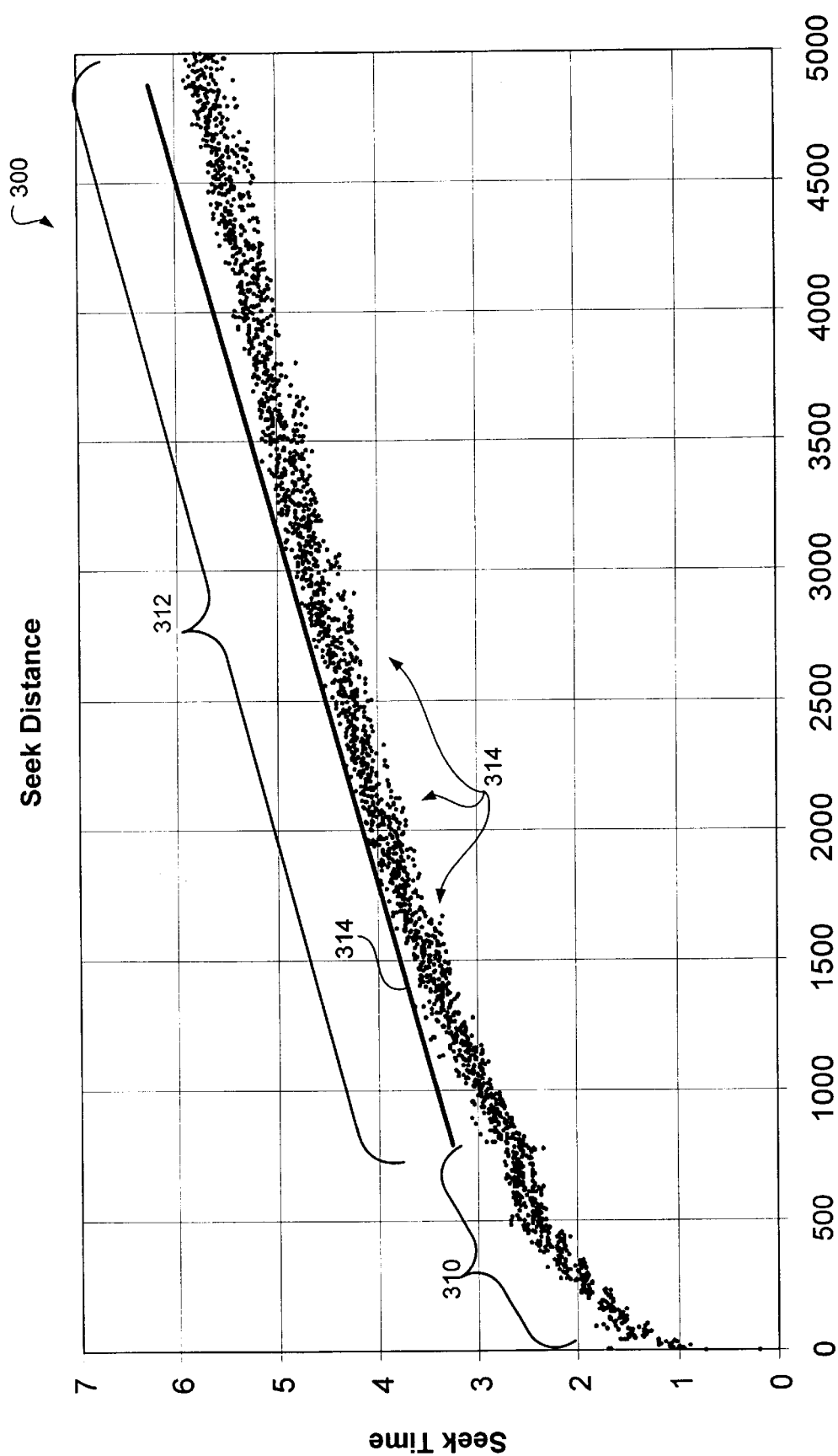
FIG. 3 illustrates a seek profile of an exemplary disc drive.

FIG. 3 is a graph 300 illustrating a seek profile of a disc drive. The seek profile includes a number of data points 308 showing seek times at corresponding seek distances for a disc in a disc drive. As shown by the graph 300, the relationship between seek time and seek distance is substantially non-linear (see non-linear region 310) for short seek distances and is somewhat more linear (see linear region 312) for longer seek distances. As described previously, one prior art technique that takes advantage of these "linear" and "non-linear" regions of the seek profile involves using a single linear equation to compute seek times for longer seeks in the "linear" portion 312 of the seek profile and a seek time array for short seeks in the non-linear region 310 of the seek profile.

While this prior art technique has been proven reasonably successful, there are a number of drawbacks associated with the use of this technique. First, as shown by the reference line 314, the so called "linear portion" of the seek profile is typically not perfectly linear. As such, techniques which use a single linear equation to compute seek times in this "linear region" may not be highly accurate. Secondly, the seek time array used with this prior art technique typically include a preselected number of seek distances and corresponding estimated seek times that are initially computed using a "generic" seek profile. This "generic" seek profile is typically generated using piecewise-linear approximations of actual seek performance taken from a representative disc drive. These piecewise-linear approximations are determined manually by a test engineer after viewing a graph or some other representation of actual seek times versus seek distances as measured in the representative disc drive. The seek time array is then computed from the seek profile which, in turn, is stored in disc drives of each disc drive of that particular module type. As such, these representative seek profiles, or the seek time arrays that are derived from representative seek profiles, are not highly accurate as they are not initially tailored for each particular disc drive in which they are used.

Figure 4:
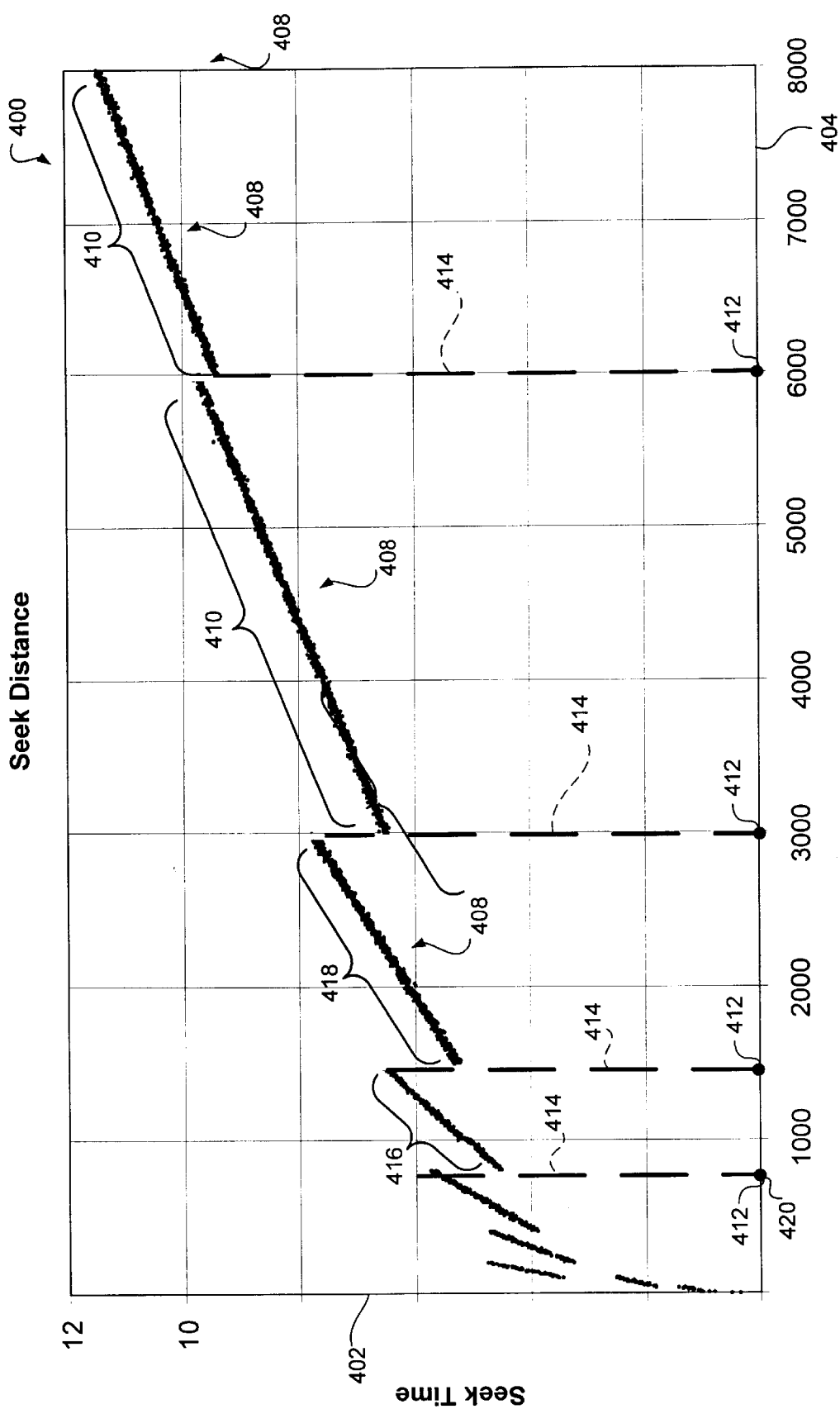
FIG. 4 illustrates one possible seek profile of the disc drive shown in FIG. 1.

Turning now to FIG. 4, shown therein is a graph 400 illustrating a seek time profile of a disc drive employing different sets of control parameters for controlling seeks of within different seek ranges. The graph includes a seek time axis 402 and a seek distance axis 404. The graph 400 shows a number of data points 408 defining seek times for various seek distances. As can be seen from the graph 400, the seek time/seek distance data points 408 are generally grouped into a number of significantly linear segments 410 between points of discontinuity 412 along the seek distance axis 404, as shown by dashed lines 414. In one embodiment, the points of discontinuity are the result of the use of different seek parameters for performing seek operations of various lengths. For example, and without limitation, as shown in FIG. 4, one set of servo parameters may be used to carry out seek operations having seek lengths between 800 and 1300 cylinders. This is illustrated in the graph 400 by the group of seek time/seek distance data points 416. Similarly, another set of servo parameters may be used to carry out seek operations having seek lengths between 1300 and 2900 cylinders. This is illustrated in the graph 400 by the group of seek time/seek distance data points 418, and so on. As described above, each of the points of discontinuity 412 may be stored in a servo data table stored in memory within the disc drive. The servo data table may then be used by the microprocessor or the servo controller to indicate the appropriate set of parameters for use with respect to a given seek distance.

Various embodiments of the present invention relate to methods and/or systems for automatically determining a seek profile in a disc drive, such as disc drive 100. In one embodiment, a seek profile is determined or generated in the disc drive 100 automatically using operating code stored in the disc drive 100. Preferably, this operating code is stored in memory in the disc drive 100 and is run as a part of a manufacturing process of the disc drive. In an alternative embodiment, the operating code may be stored in a memory located remotely from the disc drive and run on a processor located remotely from the disc drive, such as a processor in a disc drive testing station or workstation.

In one embodiment, the computed or generated seek profile of the disc drive 100 is represented by values stored in a seek time list 232. In another embodiment, the computed or generated seek profile of the disc drive 100 is represented by values stored in a seek time list 232, together with values stored in a seek time array 234. Whether the seek profile is represented by a seek time list alone or by a seek time list in conjunction with a seek time array may be dependent on the memory capacity of the disc drive 100. For example, in disc drives having relatively small memory available for storing values representing a seek profile, the use of a seek time list alone may be preferable. In contrast, in disc drives having relatively large memory available for storing values representing a seek profile, the use of a seek time list together with a seek array alone may be preferable. In the case where a seek profile is represented by a seek time array and a seek time list, the seek time array will preferably be used to define seek times for shorter seek distances, while the seek time list will be used to define seeks of longer distances. For example, the seek time array 234 may be used to define seek times for seek distances ranging between 1 cylinder and T cylinders, where T is a threshold seek distance, such as the threshold seek distance 420 (FIG. 4). The seek time list would then be used to define seek times for all seek distances greater than T.

As described, the values of the seek time array 234 may comprise ordered pairs corresponding to actual seek times computed for various associated seek distances in the disc drive 100. As will be understood, the term ordered pair is used here to represent two associated values, stored or associated in whatever form or order in memory. Each ordered pair includes a value representing a particular seek distance in the disc drive 100 and a value representing a seek time corresponding to that particular seek distance. For example, an ordered pair may include a value representing a seek distance of 100 cylinders and a corresponding seek time of 10 microseconds.

Each ordered pair in the seek time array 234 includes an actual seek time that is computed for an associated seek distance in the disc drive 100 during a disc drive manufacturing testing process. Preferably, a seek time will be computed for each seek distance less than or equal to the threshold seek distance. Alternatively, seek times may be computed only for selected seek distances less than or equal to the threshold seek distance. For example, an ordered pair defining a seek time for a seek distance of 1000 cylinders may define a single seek time that is applicable to seek distances of 999 cylinders and/or 1001 cylinders. In either case, the actual seek times will be computed for each seek distance represented in the seek time array 234. It will be understood to those skilled in the art that the seek times may also be computed for select seek distances less than the threshold seek distance, rather than for seek distances less than or equal to the threshold seek distance. The use of "less than or equal to" or "less than" with respect to various operations described herein is a simple design choice and is not intended to limit the invention.

Figure 5:
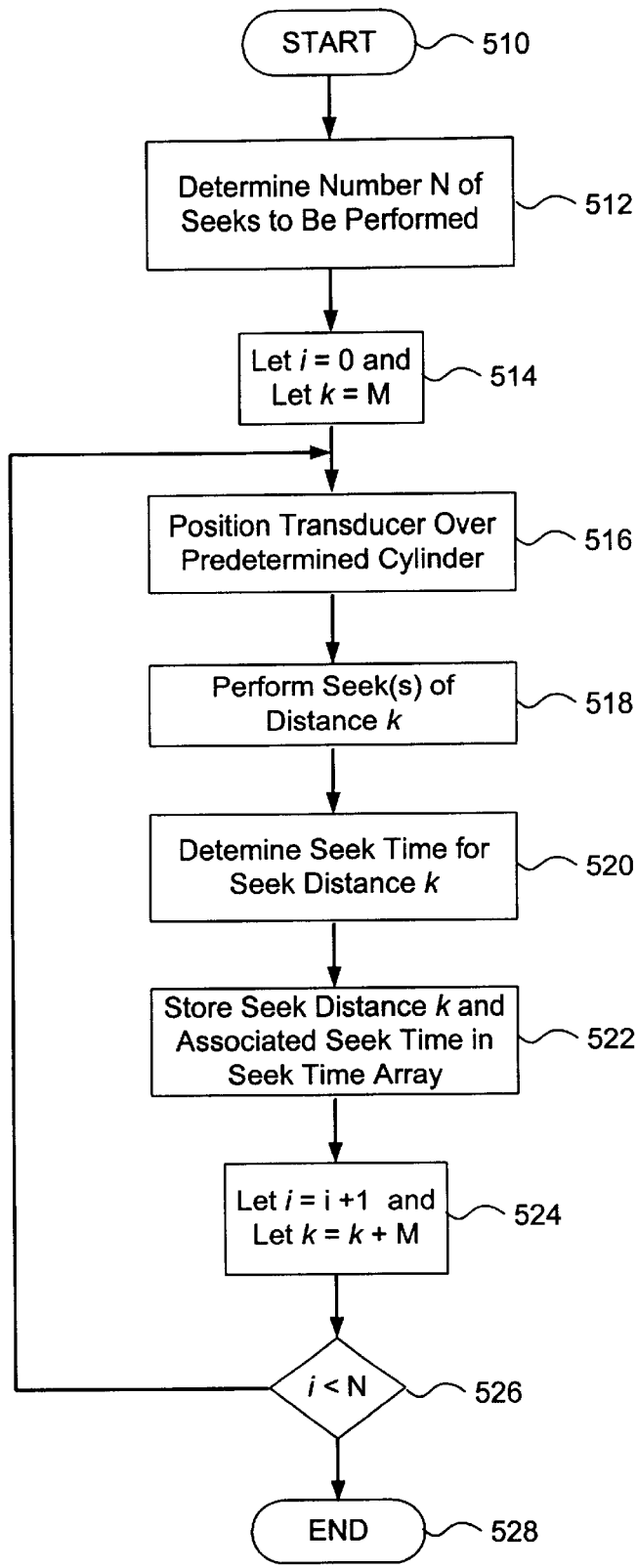
FIG. 5 illustrates one operation flow that may be used in compiling a seek time array for the disc drive shown in FIG. 1.

FIG. 5 illustrates an operational flow 500 that may be used to compile the seek time array 234. As shown, following a start 500 of the operational flow 500 a determination operation 512 determines a number N of seeks to be performed in compiling the seek time array 234. The number of seeks to be performed in compiling the seek time array is related to the threshold seek distance and the desired "granularity" of the seek time array, where the granularity relates to the seek distance or spacing desired between the seek distances in the seek array. For example, if the seek array were to include every other seek distance between 1 cylinder and T cylinders, N may equal T divided by 2. If the seek array were to include every third seek distance between 1 cylinder and T cylinders, N may equal T divided by 3, and so on. The granularity of the seek time array, as well as the threshold seek distance, are preferably predetermined prior to the compilation of the seek time array and/or the seek time list.

Following the determination operation 512, set operation 514 sets a variable (such as i) to zero and a variable (such as k) to M. As will be shown, i is used as a counter variable and k is variable that is used to set the granularity of the seek distances. Following the set operation 514, a positioning operation 516 positions the transducer over a predetermined cylinder in the disc drive 100. It is from this predetermined cylinder that a seek of a given distance will be performed. In one embodiment, the predetermined position will be over the first cylinder in the disc drive 100. However, in other embodiments the predetermined position may be over other cylinders.

After the transducer has been positioned over the predetermined cylinder, a seek operation 518 moves the transducer k cylinders. A seek time determination operation 520 then determines the time taken for the seek operation 518 to perform the seek of distance k cylinders. The determination of the time taken for the seek operation 518 to perform the seek of distance k cylinders may be made in any number of conventional ways. While the seek operation 518 and the seek time determination operation 520 are shown as occurring separately in the operational flow 500, these operation may occur simultaneously. Additionally, while only a single seek operation is shown as being performed with respect to seek operation 518, multiple seek operations of the given seek distance may be performed by seek operation 518. In such a case, seek time determination operation 520 may then determine the seek times for each seek operation performed and compute a single associated seek time from these the determined seek times. For example, and without limitation, the seek time determination operation 520 may average all of the seek times associated with the multiple seeks of the same seek distance and average these seek times to determine a single seek time associated with the given seek distance. Additionally, the seek time determination operation 520 may add an adjustment factor to the determined seek time. For example, as described in greater detail below with respect to the seek time list, the seek time determination operation 520 may compute a standard deviation of the measured multiple seek times, and add some multiple of the computed standard deviation to the average seek time to produce an adjusted seek time associated with the given seek distance.

Once the seek time determination operation 520 has determined the time taken to perform the seek operation of distance k, a store operation 522 stores the seek distance k together with its associated seek time in the seek time array 234 in memory. The stored associated seek time may be seek time resulting from a single seek operation, an average seek time, or an adjusted seek time. The seek distances and associated seek times may be stored as ordered pairs in the seek array. Alternatively, the seek distances and associated seek times may be stored in other associative manners, as are known in the art.

Following the store operation 522, a set operation 524 increments i by setting i=i+1, and increments k by setting k=k+M. Next, a determination operation 526 determines if i<N. In this way, the determination operation 526 determines if the predetermined number of seeks N to be performed in compiling the seek array have been performed. If the determination operation 526 determines that the predetermined number of seeks have been performed, such as when i=N, the operational flow 500 ends 528. If, however, the determination operation 526 determines that the predetermined number of seeks have not been performed, such as when i<N, the operational flow 500 returns to the position operation 516, and the operational flow continues as shown in FIG. 5. In one embodiment, the predetermined cylinder over which the position operation 516 positions the transducer will remain constant throughout the operational flow 500. In other embodiments the predetermined cylinder over which the position operation 516 positions the transducer may vary.

While the operational flow 500 shows the seek operations being performed, and associated seek times being measured, for increasing seek distances, in alternative embodiments the seek operations and associated seek time measurements may be carried out in other orders. For example, and without limitation, the order of seek distances performed, and associated seek times determined, may be from the longest seek time to the shortest seek time. Alternatively, seeks may be performed randomly at various distances, and associated seek times determined, in a semi-random fashion until seek distances of all desired lengths have been performed.

Preferably, the seek time array is stored in some form of non-volatile memory within the disc drive, such as, without limitation, a reserve track on a disc 108 in the disc drive 100 or in flash in the disc drive 100.

Turning now to the seek time list 232, in one embodiment the seek time list includes sets of ordered pairs, wherein each set of ordered pairs defines a line segment characterizing the relationship between seek times and corresponding seek distances over a given range of seek distances. In this embodiment, each ordered pair in a set of ordered pairs defines one endpoint of a line segment.

Figure 6:
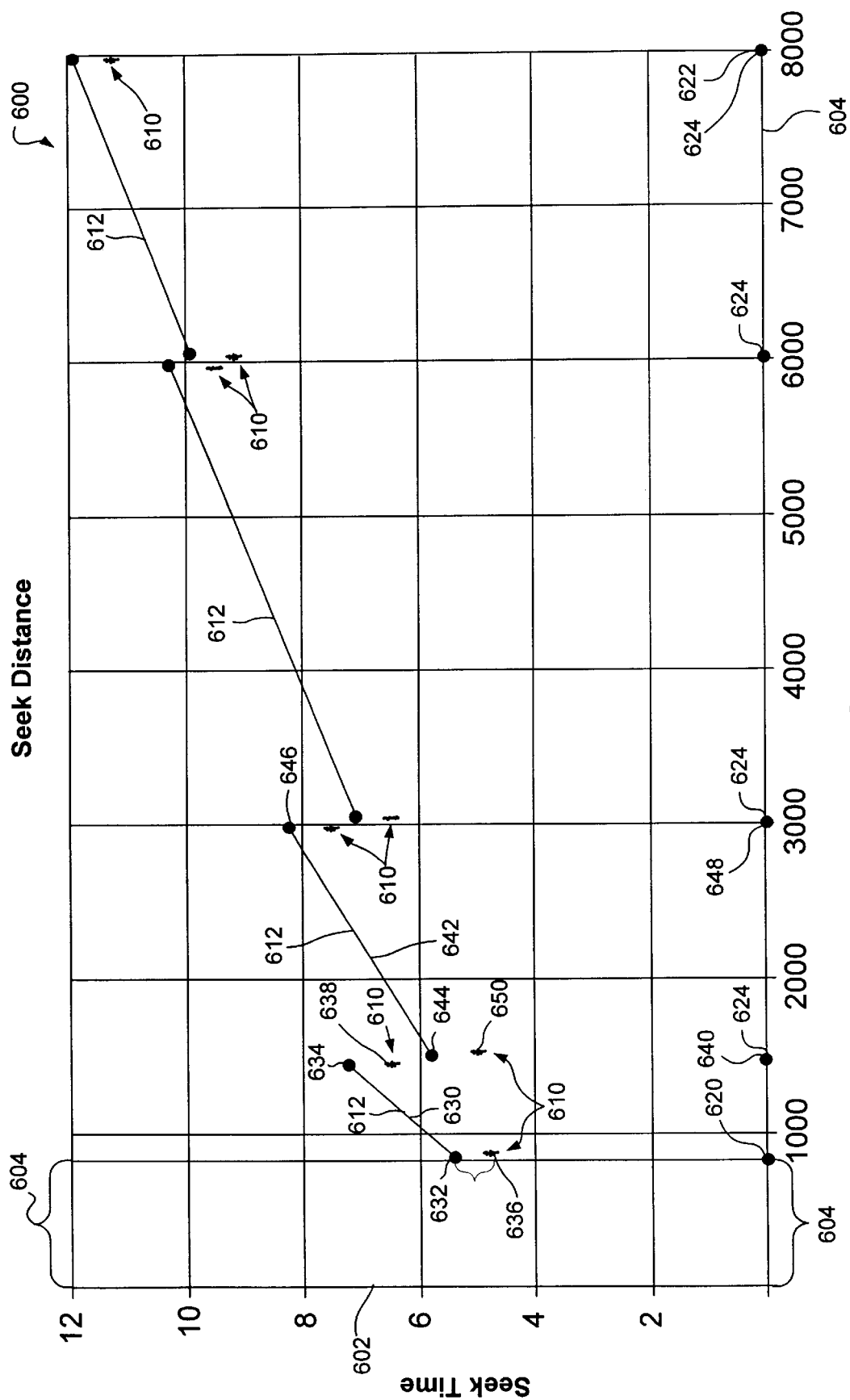
FIG. 6 illustrates another possible seek profile of the disc drive shown in FIG. 1.

FIG. 6, shows a graph 600 illustrating groups of sample points 610 taken in acquiring a seek time list 232 of the disc drive 100. Also shown in FIG. 6 are a number of line segments 612 characterizing a relationship between seek times and corresponding seek distances over a range of seek distances between a threshold seek distance 620 and a seek distance of approximately 8000 cylinders 622. It should be understood that the groups of sample points 610 and the line segments 612 shown in FIG. 6 are provide here for illustration purposes, and are not intended to necessarily define or limit actual seek characteristics of the disc drive 100.

Each group of sample points 610 includes a number of individual sample points measured at a given seek distance. As explained in greater detail below, in one embodiment the given seek distances at which each group of sample points relates either to the threshold seek distance 620 or one of a number of points of discontinuity 624 in the seek profile of the disc drive 100. The of points of discontinuity 624 may be the result of the use of different seek parameters for performing seek operations of various lengths. In this embodiment, a seek length relating to each point of discontinuity 624 is stored in the servo data table 230 in the disc drive 100, as described previously.

As shown in FIG. 6, each line segment 612 is defined by two endpoints. In turn, each endpoint is defined by a group of sample points 610. For example, a first line segment 630 is defined by a first endpoint 632 and a second endpoint 634. The first endpoint 632 is defined by a first group of sample points 636 and the second endpoint 634 is defined by a second group of sample points 638. As will be described in greater detail below, in determining a given endpoint, a predetermined number of sample points 610 are measured at a given seek distance. In one embodiment, a mean seek time is then determined for the given seek distance. The given endpoint may then be defined in terms of the given seek distance and the mean seek time. In one embodiment, the given endpoint is not located precisely at the mean seek time, but rather at a seek time greater than the mean seek time. For example, the given endpoint may be located at a seek time that is one or more standard deviations of the mean seek time above the calculated mean seek time. In a preferred embodiment, the given endpoint is located at a seek time that is three standard deviations of the mean seek time above the calculated mean seek time at the given seek distance.

As shown in FIG. 6, the first line segment 630 is defined by the first endpoint 632 located at or near the threshold seek distance 620 and the second endpoint 634 located at a first point of discontinuity 640. As also shown in FIG. 6, a second line segment 642 is defined by the first endpoint 644 located at or near the first point of discontinuity 640 and the second endpoint 646 located at or near a second point of discontinuity 648. As will be noted, the second endpoint 634 of the first line segment 630 and the first endpoint 644 of the second line segment 642 both occur near the first point of discontinuity 640. The precise seek distance at which the group of sample points 638 defining and endpoint are measured may be determined in a number of ways. For example, the group of sample points 638 defining the second endpoint 634 may be measured at a seek distance which is slightly less than the first point of discontinuity 640. The group of sample points 650 defining the first endpoint 644 of the second line segment 642 may then be measured at a seek distance which is exactly at the first point of discontinuity 640. Alternatively, the group of sample points 638 defining the second endpoint 634 may be measured at the first point of discontinuity 640, while the group of sample points 650 defining the first endpoint 644 of the second line segment 642 may then be measure at a seek distance which is one track greater than the first point of discontinuity 640.

Figure 7:
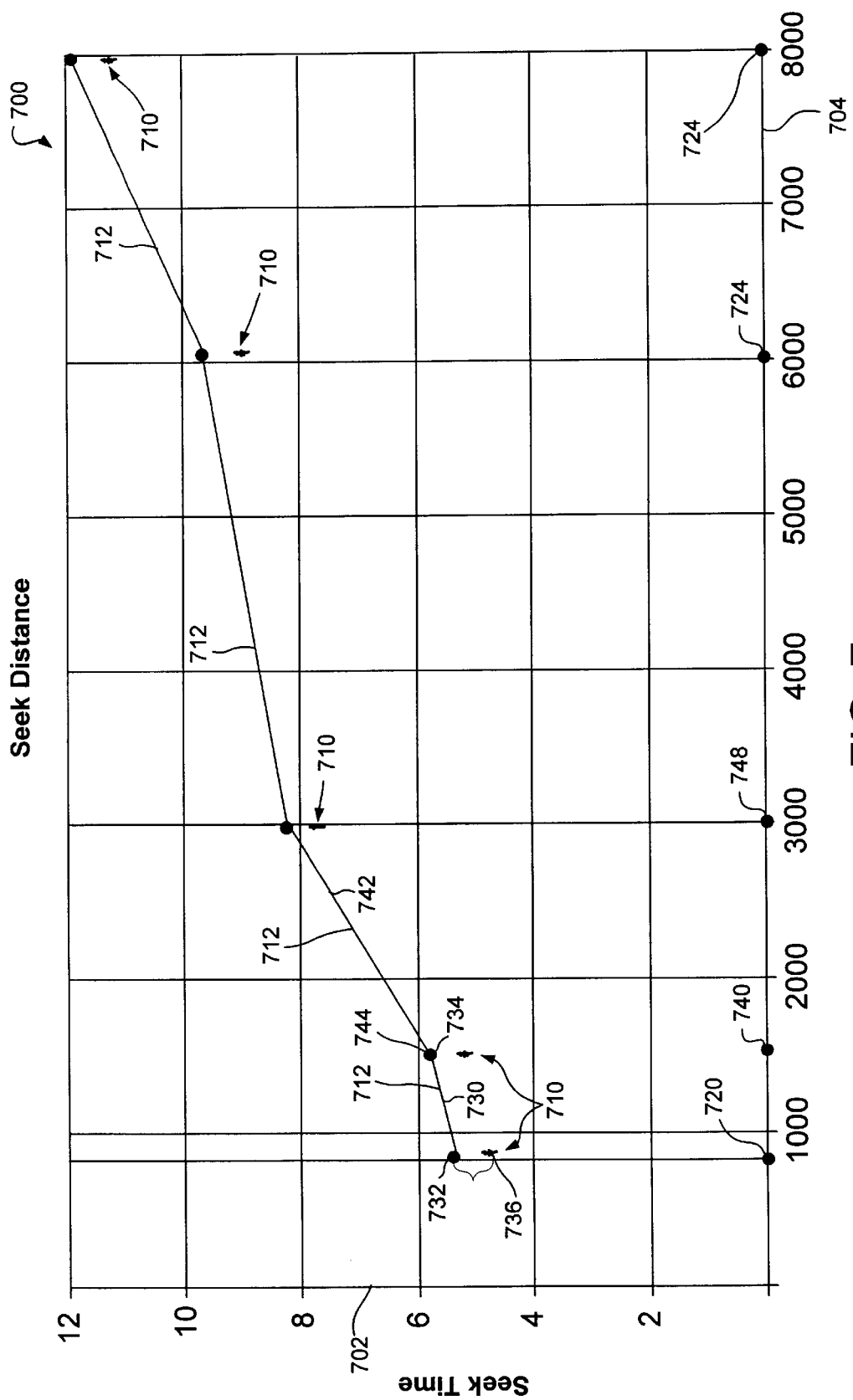
FIG. 7 illustrates yet another possible seek profile of the disc drive shown in FIG. 1.

FIG. 6 illustrates a case where none of the endpoints of the line segments, occurring at or near a common point of discontinuity, have a common seek time. As such, none of the line segments 612 have a common endpoint with another line segment. In contrast, FIG. 7 illustrates a case where each line segment 712 shares an endpoint with another line segment. As in FIG. 6, each line segment 712 in FIG. 7 is defined by two endpoints. In turn, each endpoint is defined by a group of sample points 710. As shown in FIG. 7, the first line segment 730 is defined by the first endpoint 732 located at or near the threshold seek distance 720 and the second endpoint 734 located at a first point of discontinuity 740. A second line segment 742 is defined by the first endpoint 744 located at or near the first point of discontinuity 740 and the second endpoint 746 located at or near a second point of discontinuity 748. As will be noted, the second endpoint 734 of the first line segment 730 and the first endpoint 744 of the second line segment 742 both occur at the first point of discontinuity 740. Additionally, as shown in FIG. 7, the second endpoint 734 of the first line segment 730 and the first endpoint 744 of the second line segment 742 both occur at the same seek time. In the case, such as that just described, where two endpoints occur at the same seek time and the same seek distance, only a single set of sample points 710 is needed to define the two endpoints. Furthermore, in the case where each endpoint occurring at a point of discontinuity is common to two line segments, only a single group of sample points 710 need be measured at each point of discontinuity to define the endpoints occurring at points of discontinuity.

In addition to the cases shown in FIGS. 6 and 7, a further case may exist wherein some of the line segments having endpoints occurring at or near a common point of discontinuity share end points and other line segment having endpoints occurring at or near a common point of discontinuity do not share end points. In such a case, those endpoints that are common to two line segments may require only a single group of sample points 710 to define the common endpoints. In contrast, an endpoint for a line segment that occurs at or near a point of discontinuity that is not shared by another line segment will be defined by single group of sample points 710 that does not define an endpoint for any another line segment.

Figure 8:
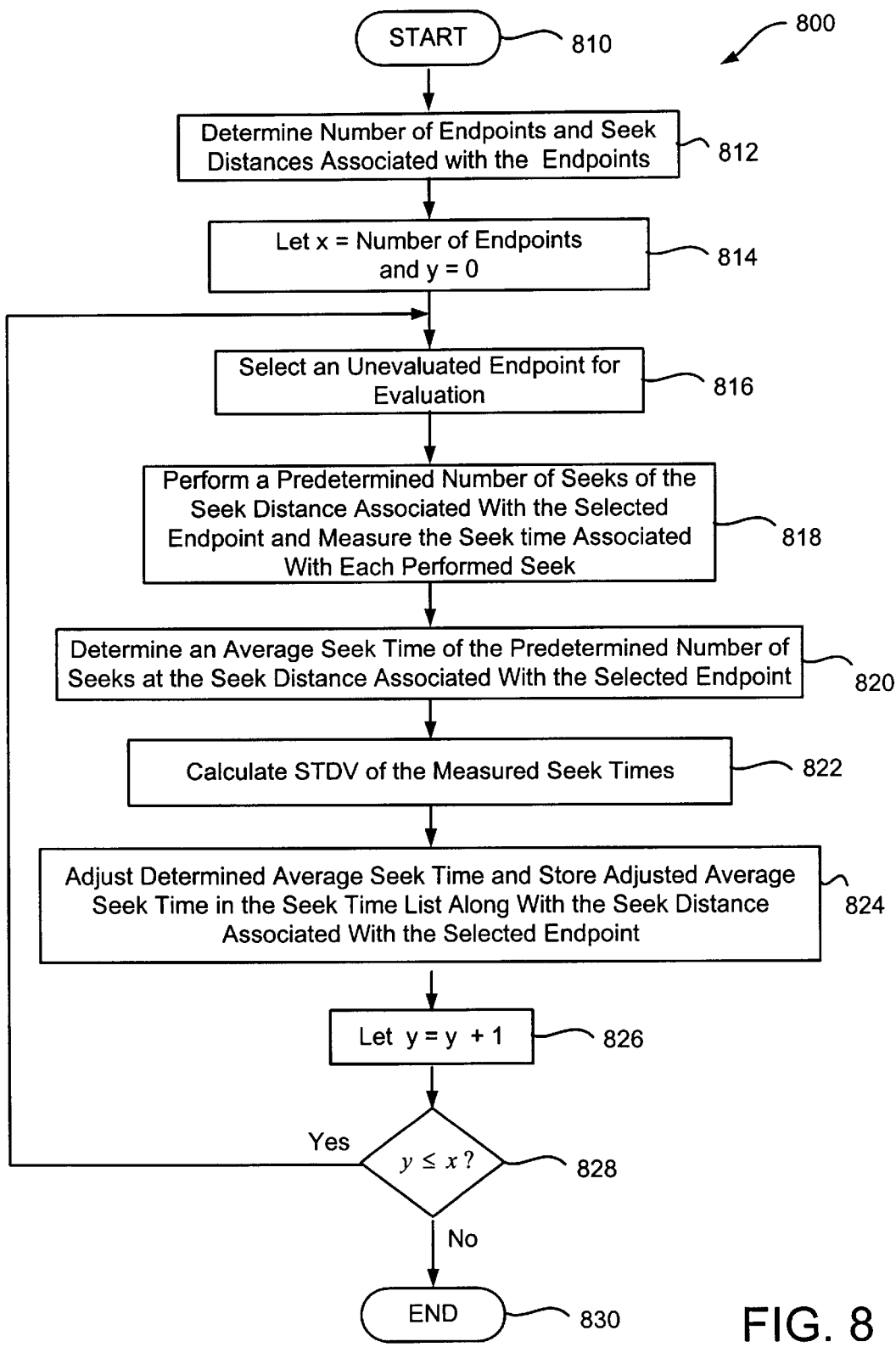
FIG. 8 illustrates one operation flow that may be used in compiling a seek time list for the disc drive shown in FIG. 1.

FIG. 8 illustrates an operational flow 800 that may be used to compile the seek time list 232. As shown, following a start 810 of the operational flow 800, a determination operation 812 determines the number endpoints and seek distances associated with each of the endpoints that will be used to define line segments that characterize all or a portion of a seek profile of the disc drive 100. As described above, each line segment is defined by two endpoints. In one embodiment, seek distances relating to each endpoint are stored in a servo data table 230, as points of discontinuity. Additionally, a seek distance relating to an endpoint of one of the line segments may be predetermined, such as by a threshold seek distance. If the endpoint of one of the line segments occurs at the threshold seek distance, this threshold seek distance may be stored separately from the servo data table 230. Alternatively, if the threshold seek distance occurs at a point of discontinuity, the threshold seek distance is already present in the servo data table 230 and, therefore, the threshold seek distance need not be stored separately from the servo data table 230.

Once the number of endpoints and the seek distances associated with each of the endpoints has been determined, a set operation 314 sets a variable x equal to the determined number of endpoints and another variable y equal to zero. Next, a select operation 816 selects an unevaluated endpoint for evaluation or measurement. As used herein, an evaluation of a given endpoint includes performing operations 818, 820, 822, and 824 with respect to that given operation. As such, an unevaluated endpoint is any endpoint with respect to which operations 818, 820, 822, and 824 have not been performed. The order in which unselected endpoints are selected by select operation 816 may vary. However, in a preferred embodiment, the first time the select operation 816 is performed in the operational flow 800, the select operation 816 will select the endpoint associated with the threshold distance. Then, each successive time the determination operation 816 is performed during the operational flow 800, the select operation 816 will select an endpoint in accordance with the order in which seek distances relating to each endpoint are stored in a servo data table 230.

After an endpoint has been selected by selection operation 816, a seek operation 818 performs a predetermined number of seeks of the seek distance associated with the selected endpoint and measures the seek time required for each seek. Preferably, the number of seeks that will be performed by the seek operation 818 will be selected such that an accurate characterization of the seek time required to perform a seek of the seek distance associated with the selected endpoint can be made. For example, and without limitation, in one embodiment, the predetermined number of seek operations is approximately thirty seeks. In one embodiment, the precise location where each of the predetermined seeks are carried out on the disc is static. That is, the starting point of the seek is located at the same cylinder each time one of the predetermined number of seeks is carried out. In another embodiment, the precise location where each of the predetermined seeks are carried out on the disc is non-static. That is, the starting point of the seek is not necessarily located at the same cylinder each time one of the predetermined number of seeks is carried out.

Following the seek operation 818, a determination operation 820 determines an average seek time of the predetermined number of seeks performed at the seek distance associated with the selected endpoint. The average seek time may be determined, for example, by calculating the sum of the seek times measured for each of the predetermined number of seeks performed by seek operation 818, and then dividing the calculated sum by the predetermined number of seeks. After the average seek time has been calculated by the determination operation 820, a calculate operation 822 calculates the standard deviation of the seek times measured for each of the predetermined number of seeks performed by seek operation 818. The standard deviation of the measured seek times may be computed in any number of ways known in the art. For example, and without limitation, Equation 1 may be used to compute the standard deviation:

$$STDV = \sqrt{\frac{\sum_{1}^{n}(x-x')^2}{n-1}} \quad \text{Equation (1)}$$

Where x is an individual measured seek time, x' is the mean of the measured seek times, and n is the predetermined number.

In one alternative, Equation 2 may be used to compute the standard deviation:

$$STDV = \sqrt{\frac{\sum_{1}^{n}(x-x')^2}{n}} \quad \text{Equation (2)}$$

Once a standard deviation of the seek times has been determined by the calculate operation 822, in one embodiment, an adjustment operation 824 adjusts the average seek time determined by determination operation 820 and stores the adjusted average seek time in the seek time list 232 along with the seek distance associated with the selected endpoint. In one embodiment, adjusted average seek time and the seek distance associated with the selected endpoint are stored as an ordered pair in the seek time list 232. In a further embodiment, two such ordered pairs are stored, each of which defines one endpoint of a common line segment, as a set of ordered pairs in the seek time list 232.

In one embodiment, the adjustment operation 824 adds a positive adjustment value to the average seek time, such that the adjusted average seek time is greater than the determined average seek time. In this way, it is more likely that actual seek times carried out in the disc drive will occur within a seek time predicted using the seek time list 232. This is particularly important when the seek time list is used in the process of command queue ordering, where an overly optimistic seek time prediction may lead to additional rotational latency if an actual seek time exceeds a predicted seek time.

In one embodiment, the positive adjustment added to the determined average seek time by the adjustment operation 824 is approximately three standard deviations, as calculated by calculation operation 822. Adding three standard deviations assures that greater than 99% of estimated seek times predicted using the seek list will occur in less than the adjusted average seek time.

Following the adjustment operation 824, a set operation 826 increments y by setting y=y+1. Next, a determination operation determines if y is less than or equal to x. If y is not less than or equal to x, the operational flow ends 830. However, if y is less than or equal to x, the operational flow 800 returns to the select operation 816. The operations 816, 818, 820, 822, 824, 826, and 828 form a loop that is continued until y is not less than or equal to x. That is, the loop is continued until each of the operations of the loop are performed with respect to all endpoints.

Once the seek time list 232 has been fully compiled, such as by using the operations of operation flow 800, the compiled seek time list 232 is stored for future use in some form of non-volatile memory in the disc drive. For example, and without limitation, the compiled seek time list 232 may be stored on a reserve track on the disc drive 100.

Figure 9:
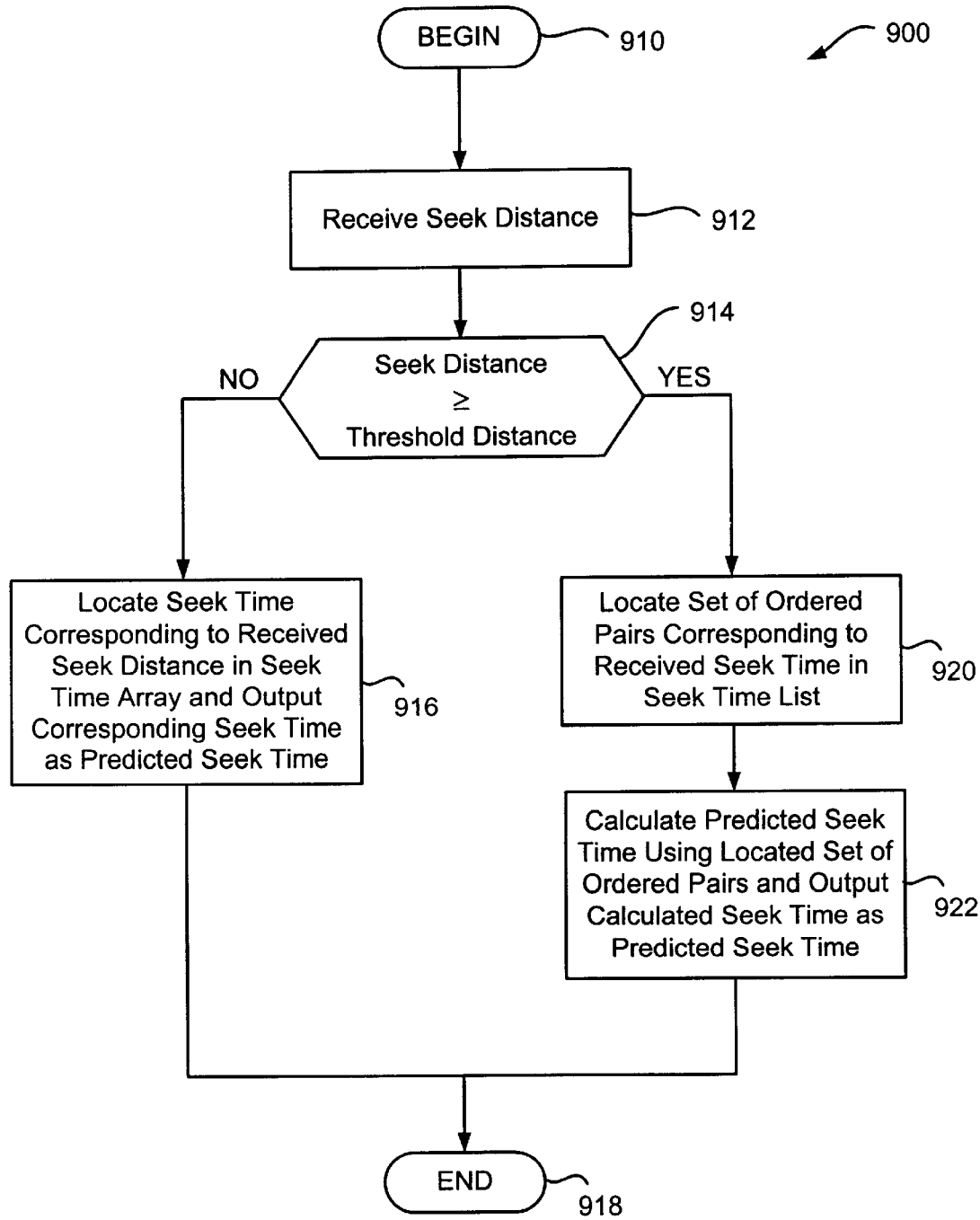
FIG. 9 illustrates one operation flow for determining a seek time for a given seek distance in the disc drive shown in FIG. 1, using a seek time profile and a seek time list.

As described, in one embodiment the prediction of seek times for given seek distances in the disc drive 100 may be made using the seek time list 232 alone. In another embodiment, the prediction of seek times for given seek distances in the disc drive 100 may be made using the seek time list 232 together with the seek time array 234. FIG. 9 illustrates a simplified operational flow 900 using both the seek time array 234 or the seek time list 232 to predict a seek time for a given seek distance in the disc drive.

As shown in FIG. 9, following a start 910 of the operational flow 900, a receive operation 912 receives a seek distance for which an estimated or predicted seek time is desired. A determination operation 914 then determines if the received seek distance is greater than or equal to a threshold distance. As described above, the threshold distance is preferably predetermined and stored in memory the disc drive 100. As such, the seek operation may access the threshold distance from memory and then compare the received seek distance to the threshold distance to determine if the received seek distance is greater than or equal to a threshold distance.

If the received seek distance is determined by determination operation 914 not to be greater than or equal to a threshold distance, a locate operation 916 locates a seek time in the seek time array 234 that corresponding to the received seek distance and outputs the corresponding seek time as an estimated or predicted seek time. The operational flow 900 then ends following the output of the predicted seek time. As described above, the seek time array 234 may contain ordered pairs, each ordered pair having a seek time and an associated seek distance. In such a case, the location of a seek time corresponding to a received seek distance by the locate operation 916 may be carried out using any number of methods or algorithms for searching an array of ordered pairs.

If the received seek distance is determined by determination operation 914 to be greater than or equal to the threshold distance, a locate operation 920 locates a set of ordered pairs in the seek time list 932 that corresponds to the received seek distance. After the locate operation 920 locates the appropriate set of ordered pairs, a calculate operation 922 calculates a seek time using the received seek distance and the set of ordered pairs located by the locate operation 920 and outputs the calculated seek calculated seek time as a predicted seek time. The operational flow 900 is then ended following the output of the predicted seek time.

In one embodiment, the calculate operation 922 uses the set of ordered pairs to define a straight line segment having endpoints defined by the set of ordered pairs. In such a case, the straight line defines a linear relationship between seek distances and seek times over a range of seek distances defined by the set of ordered pairs. A seek time corresponding to the received seek distance may then be calculated by using the line segment in any number of known ways. For example, and without limitation, a seek time corresponding to the received seek distance may be calculated by linear interpolation using the line segment defined by the located set of ordered pairs.

As described, the seek time array may include ordered pairs that define individual seek times versus individual seek distances in a selected portion of an overall seek profile of the disc drive. Additionally, a single ordered pair may define a seek time for other seek distances near a particular seek distance. As also described, the seek time list may include sets of ordered pairs, wherein each set of ordered pairs defines endpoints of a line segment that characterizes seek times versus seek distances over a given seek range. The ordered pairs in both the seek time array and the seek time list are preferably computed for each individual disc drive during a manufacturing process of the disc drive. As such, the ordered pairs accurately define the relationship between seek times and associated seek distances for each individual disc drive. While the compilation of the seek time array and the seek time list in the manner described provides a highly accurate representation of an overall seek profile of a given disc drive when that disc drive is ultimately received and used by a user, changes may take place in the disc drive during operation that change the seek profile characteristics of the drive over an extended period of use. To compensate for these changes, the ordered pairs of the seek time profile and/or the ordered pairs of the seek time list may me dynamically adjusted to compensate for any changes based on the sensed actual seek times for seek distances.

In accordance with one embodiment, a stored seek time corresponding to a stored seek distance in an ordered pair in the seek time array and/or the seek time list may be modified according to the relationship shown in Equation (3):

$$\text{NEW SEEK TIME} = \alpha B + (1-\alpha)(C + ADJ) \qquad \text{Equation (3)}$$

where,

D=seek distance, $0<\alpha<1$,

B=previously first stored seek time for distance D,

C=sensed actual seek time for distance D, and

ADJ=a preselected adjustment value.

The adjustment value added to the new seek time may be one or more standard deviations of the mean seek time, calculated as described above with respect to Equation 1 or Equation 2. In a preferred embodiment, the adjustment value is three standard deviations of the mean seek time previously calculated with respect to either the seek time array or the seek time list, as applicable.

Alternatively, the previously stored seek time may be modified according to the relationship shown in Equation (4):

$$\text{NEW SEEK TIME} = \frac{\beta B + C + ADJ}{\beta + 1} \qquad \text{Equation (4)}$$

where,

D=seek distance,

β=asymptotic sample length,

B=previously stored first seek time for distance D,

C=sensed actual first seek time for distance D,

ADJ=a preselected adjustment value.

The value β is calculated according to the relationship shown in Equation 5:

$$\beta = \frac{\alpha}{1-\alpha} \qquad \text{Equation (5)}$$

where, $0<\alpha<1$, and

β is a positive integer.

As described, FIGS. 4, 8, and 9 illustrate operations in accordance with various embodiments of the present invention. In various embodiments, these operations may be executed as a sequence of computer implemented or as program modules running on a processor. It will be understood to those skilled in the art that the operations shown in FIGS. 4, 8, and 9, as well as other operations discussed above, may alternatively be implemented as interconnected machine logic circuits or circuit modules within a disc drive. Additionally, the operations may be implemented in separate components of the disc drive, such as by a dedicated servo controller. The implementation is a matter of choice dependent on the performance and design requirements of the disc drive. As such, it will be understood that the operations, structural devices, acts, and/or modules described herein may be implemented in software, in firmware, in special purpose digital logic, and/or any combination thereof without deviating from the spirit and scope of the present invention as recited within the claims attached hereto. Furthermore, the various software routines or software modules described herein may be implemented by any means as is known in the art. For example, any number of computer programming languages, such as "C", "C++", Pascal, FORTRAN, assembly language, Java, etc., may be used. Furthermore, various programming approaches such as procedural, object oriented or artificial intelligence techniques may be employed.

In various embodiments, computer implemented steps that comprise the operations are stored in some form of computer readable media. As used herein, the term computer-readable media may be any available media that can be accessed by a processor or component that is executing the functions or steps of the servo control module 400. By way of example, and not limitation, computer-readable media might comprise computer storage media and/or communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer or processor which is executing the operating code.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

In summary, one embodiment of the present invention may be viewed as an apparatus a method for determining an estimated seek time for a transducer (such as 118) to travel a given seek distance in a data storage device (such as 100). In this embodiment, a seek time array (such as 234), including a plurality of seek times and associated seek distances within a first range of seek distances, is created in the disc drive. A seek time list (such as 100), including a plurality of sets of ordered pairs defining a relationship between seek times and seek distances within a second range of seek distances, is also created in the disc drive. A given seek distance is then received (such as 912). If the given seek distance is within the first range of seek distances, the estimated seek time for the transducer to travel the given seek distance is then determined using the seek time array (such as 916). If, however, the given seek distance is within the second range of seek distances, the estimated seek time for the transducer to travel the given seek distance is determined using the seek time list (such as 922).

In this embodiment, the creation of the seek time array may occur as follows. First, a number of seek operations (such as 518), each having a unique seek distance within the first range of seek distances, is performed in the disc drive. Next, a seek time is determined for each of the performed seek operations (such as 520). Then, the unique seek distances of each the performed number of seek operations and the measured seek times associated with the unique seek distances is stored in non-volatile memory in the disc drive (such as 522).

Another embodiment of the present invention relates to a method for defining a relationship between seek times and seek distances in a disc drive (such as 100) including a servo controller (such as 228) and a servo data table (such as 230) including a list of seek distances. In accordance with this embodiment, a threshold seek distance (such as 640 or 720) is first determined. Next, each of the seek distances in the list of seek distances that is greater than the threshold seek distance is obtaining from the servo data table (such as 812). A predetermined number of seek operations is then performing at each of the obtained seek distances from the servo data table (such as 818). For each of the obtained seek distances, at least one associated seek time is determined based on the predetermined number of seek operations related to the obtained seek distance (such as 820). Each seek distance and its associated at least one seek time is then stored (such as 824) as an ordered pair in a seek time list in non-volatile memory in the disc drive. In this method, various ordered pairs are associated in sets of ordered pairs in the seek time list, each set of ordered pairs defining a linear relationship between seek times and seek distances over a range of seek distances (such as 824).

In this embodiment, the step of determining at least one associated seek time may further comprise determining an average seek time of the predetermined number of seek operations relating to the obtained seek distance (such as 820), computing a standard deviation of the average seek time (such as 822), and adding a predetermined multiple of the computed standard deviation to the seek time determined for the obtained seek distance (such as 824). Additionally, this embodiment may further include performing a predetermined number of seek operations at each of a plurality of seek distances less than the threshold seek distance (such as 528), determining a seek time associated with each individual seek distance of the plurality of seek distances based on measured seek times of the predetermined number of seek operations performed at the individual seek distance (such as 520), and storing the determined individual seek distances and the determined seek times associated with the individual seek distances in a seek time array in a non-volatile memory in the disc drive (such as 522).

Yet another embodiment of the present invention relates to a system for predicting a seek time for a given seek distance in a data storage device. In this embodiment, the system includes a data storage (such as 100) device having one or more rotating discs (such as 108) and a transducer (such as 118), wherein each of the rotating discs include a plurality of coaxially arranged substantially circular tracks (such as 120). In addition, the system includes a means for predicting a time required to for moving the transducer from one track on the disc to another track on the disc during a given seek operation (such as 224 or 228). In this embodiment, the predicting means may further include a microprocessor (such as 224) and a seek time list (such as 232) that is accessed by the microprocessor. The seek time list may contain a plurality of sets of ordered pairs, each set of ordered pairs defining a linear relationship between seek times and seek distances over a range of seek distances. Additionally, the predicting means may further include or access a seek time array (such as 234) including a number of ordered pairs, each of the number of ordered pairs including a seek distance and an associated seek time.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, while the disc drive 100 is shown in FIG. 2 as having a number of separate components, it will be understood that the function of these components may be performed by more, fewer, or different components or processes. Numerous other changes may be made which will readily suggest themselves to those skilled in the art and which are encompassed in the spirit of the invention disclosed and as defined in the appended claims.

What is claimed is:

1. A method for determining an estimated seek time for a transducer to travel a given seek distance in a data storage device, comprising steps of:
    (a) creating a seek time array including a plurality of seek times and associated seek distances within a first range of seek distances;
    (b) creating seek time list including a plurality of sets of ordered pairs, the seek time list defining a relationship between seek times and seek distances within a second range of seek distances;
    (c) receiving the given seek distance;
    (d) determining the estimated seek time for the transducer to travel the given seek distance using the seek time array if the given seek distance is within the first range of seek distances; and
    (e) determining the estimated seek time for the transducer to travel the given seek distance using the seek time list if the given seek distance is within the second range of seek distances.

2. A computer readable medium having computer-executable instructions for performing the steps recited in claim 1.

3. A method as defined in claim 1, wherein the creating step (a) comprises:
    (a)(1) performing a number of seek operations, each of the performed number of seek operations having a unique seek distance within the first range of seek distances;
    (a)(2) determining an associated seek time for each of the performed number of seek operations; and
    (a)(3) storing the unique seek distances of each the performed number of seek operations and the measured seek times associated with the unique seek distances in non-volatile memory in the disc drive.

4. A method as defined in claim 1, wherein an upper limit of the first range of seek distances is less than a predetermined threshold distance.

5. A method as defined in claim 4, wherein a lower limit of the second range of seek distances is equal to the predetermined threshold distance.

6. A method as defined in claim 5, wherein the seek time list comprises a plurality of sets of ordered pairs, each set of ordered pairs defining a linear relationship between seek times and seek distances over a portion of the second range of seek distances.

7. A method as defined in claim 6, wherein each ordered pair in the sets of ordered pairs in the seek time list includes a seek time value and an associated seek distance value.

8. A method as defined in claim 7, wherein two of the seek time values in the sets of ordered pairs in the seek time list are associated with separate entries in a servo data table.

9. A method as defined in claim 7, wherein each of the seek time values in the sets of ordered pairs in the seek time list is associated with a separate entry in a servo data table.

10. A method as defined in claim 7, wherein two of the seek time values in the sets of ordered pairs in the seek time list are associated with the same entry in a servo data table.

11. A method as defined in claim 6, wherein the determining step e) comprises:
    e)(1) selecting a set of ordered pairs that defines the linear relationship between seek times and seek distances over a portion of the second range of seek distances that includes the given seek distance; and
    e)(2) compute the estimated seek time for the transducer to travel the given seek distance using the selected set of ordered pairs.

12. A method for defining a relationship between seek times and seek distances in a disc drive, the disc drive including a servo controller and a servo data table, the servo data table including a list of seek distances, the method comprising steps of:
    (a) determining a threshold seek distance;
    (b) obtaining from the servo data table each of the seek distances in the list of seek distances that is greater than the threshold seek distance;
    (c) performing a predetermined number of seek operations at each of the obtained seek distances from the servo data table;
    (d) for each of the obtained seek distances, determining at least one associated seek time based on the predetermined number of seek operations related to the obtained seek distance;
    (e) storing each seek distance and its associated at least one seek time as an ordered pair in a seek time list in non-volatile memory in the disc drive; and
    (f) associating various ordered pairs in sets of ordered pairs in the seek time list, each set of ordered pairs defining a linear relationship between seek times and seek distances over a range of seek distances.

13. A method as defined in claim 12, wherein each of the sets of ordered pairs includes two ordered pairs.

14. A method as defined in claim 13, wherein the determining step (d) comprises determining two associated seek time for each of the performed predetermined number of seek operations.

15. A method as defined in claim 13, wherein the seek time list is stored on a reserve track in the disc drive.

16. A method as defined in claim 13, wherein the determining step (d) further comprises:
    (d)(1) determining an average seek time of the predetermined number of seek operations relating to the obtained seek distance;
    (d)(2) computing a standard deviation of the average seek time; and
    (d)(3) adding a predetermined multiple of the computed standard deviation to the seek time determined for the obtained seek distance.

17. A method as defined in claim 12, further comprising steps of:
    (g) performing a predetermined number of seek operations at each of a plurality of seek distances less than the threshold seek distance;
    (h) determining a seek time associated with each individual seek distance of the plurality of seek distances based on measured seek times of the predetermined number of seek operations performed at the individual seek distance; and
    (i) storing the determined individual seek distances and the determined seek times associated with the individual seek distances in a seek time array in a non-volatile memory in the disc drive.

18. A method as defined in claim 17, wherein the determined seek time associated with a given individual seek distance comprises an average of the measured seek times at the given individual seek distance summed with a multiple of a standard deviation of the measured seek times at the given individual seek distance.

19. A computer readable medium having computer-executable instructions for performing the steps recited in claim 12.

20. A system for predicting a seek time for a given seek distance in a data storage device, comprising:

a data storage device having one or more rotating discs and a transducer, each rotating disc including a plurality of coaxially arranged substantially circular tracks; and means for predicting a time required to for moving the transducer from one track on the disc to another track on the disc during a given seek operation.

21. A system as defined in claim 20, wherein the predicting means comprises a microprocessor executing microprocessor-executable instructions.

22. A system as defined in claim 20, wherein the predicting means further comprises a seek time list that is accessed by the microprocessor, the seek time list containing a plurality of sets of ordered pairs, each set of ordered pairs defining a linear relationship between seek times and seek distances over a range of seek distances.

23. A system as defined in claim 22, wherein the disc drive includes means for compiling the seek time list.

24. A system as defined in claim 23, wherein the predicting means further comprises a seek time array, the seek time array including a number of ordered pairs, each of the number of ordered pairs including a seek distance and an associated seek time.

25. A system as defined in claim 24, wherein the disc drive includes means for compiling the seek time array.

26. A system as defined in claim 25, wherein the number of object pairs in the seek time array define a relationship between seek times and seek distances less than a predetermined threshold seek distance, and wherein the sets of ordered pairs in the seek time list define a relationship between seek times and seek distances greater than the predetermined threshold seek distance.

27. A system as defined in claim 26, wherein each of the sets of ordered pairs in the seek time list defines a linear relationship between seek times and seek distances of a unique range of seek distances.

28. A system as defined in claim 23, wherein each ordered pair in a set of ordered pairs includes a seek distance and an associated seek time.

29. A system as defined in claim 27, wherein the disc drive further includes a servo data table including a plurality of seek distances entries, and wherein at least one seek distance in one of the ordered pairs in the sets of ordered pairs in the seek time list is associated with a seek distances entries in the servo data table.

30. A system as defined in claim 29, wherein at least one seek distance in one of the ordered pairs in the sets of ordered pairs in the seek time list is associated with the threshold seek distance.

* * * * *